(12) United States Patent
Tracht et al.

(10) Patent No.: US 7,311,325 B2
(45) Date of Patent: Dec. 25, 2007

(54) VEHICLE SEAT ASSEMBLY WITH AIR BAG SEAM OPENER

(75) Inventors: Michael L. Tracht, Ingolstadt (DE); Rainer Penzel, Munich (DE)

(73) Assignee: Lear Corporation, Southfield, MI (US)

( * ) Notice: Subject to any disclaimer, the term of this patent is extended or adjusted under 35 U.S.C. 154(b) by 413 days.

(21) Appl. No.: 10/904,837

(22) Filed: Dec. 1, 2004

(65) Prior Publication Data

US 2006/0113763 A1 Jun. 1, 2006

(51) Int. Cl.
*B60R 21/207* (2006.01)
(52) U.S. Cl. .................................................. 280/730.2
(58) Field of Classification Search ............. 280/728.2, 280/728.3, 730.2; 297/216.1, 216.11, 216.12, 297/216.13, 216.14
See application file for complete search history.

(56) References Cited

U.S. PATENT DOCUMENTS

| | | | |
|---|---|---|---|
| 5,498,030 A | 3/1996 | Hill et al. | |
| 5,667,242 A * | 9/1997 | Slack et al. | 280/730.2 |
| 5,749,597 A | 5/1998 | Saderholm | |
| 5,762,363 A | 6/1998 | Brown et al. | |
| 5,799,970 A | 9/1998 | Enders | |
| 5,799,971 A * | 9/1998 | Asada | 280/730.2 |
| 5,810,389 A * | 9/1998 | Yamaji et al. | 280/730.2 |
| 5,816,610 A | 10/1998 | Higashiura et al. | |
| 5,860,673 A | 1/1999 | Hasegawa et al. | |
| 5,890,734 A * | 4/1999 | Saderholm | 280/730.2 |
| 5,893,579 A * | 4/1999 | Kimura et al. | 280/730.2 |
| 5,897,134 A * | 4/1999 | Stein et al. | 280/728.3 |
| 5,927,749 A | 7/1999 | Homier et al. | |
| 5,938,232 A | 8/1999 | Kalandek et al. | |
| 5,967,546 A | 10/1999 | Homier et al. | |
| 6,007,091 A * | 12/1999 | Westrich | 280/730.2 |
| 6,045,151 A | 4/2000 | Wu | |
| 6,179,324 B1 * | 1/2001 | White et al. | 280/730.2 |
| 6,206,410 B1 * | 3/2001 | Brown | 280/728.3 |
| 6,237,934 B1 | 5/2001 | Harrell et al. | |
| 6,293,580 B1 * | 9/2001 | Lachat et al. | 280/728.3 |
| 6,352,304 B1 * | 3/2002 | Sorgenfrei | 297/216.13 |
| 6,386,577 B1 * | 5/2002 | Kan et al. | 280/730.2 |
| 6,450,528 B1 * | 9/2002 | Suezawa et al. | 280/730.2 |
| 6,457,741 B2 * | 10/2002 | Seki et al. | 280/730.2 |

(Continued)

FOREIGN PATENT DOCUMENTS

DE 103 07 480 A 9/2004

(Continued)

*Primary Examiner*—Faye M. Fleming
(74) *Attorney, Agent, or Firm*—Brooks Kushman P.C.

(57) ABSTRACT

In at least certain embodiments, the vehicle seat assembly comprises a frame, a seat pad, a trim cover including a release seam, a connector to maintain the release seam in a closed position, and an air bag assembly within the trim cover. In accordance with this embodiment, the air bag assembly includes an air bag inflatable to project outwardly through the air bag release seam when the air bag seam is in an opened position. Further in accordance with this embodiment, the vehicle seat assembly further includes an air bag guide and a member comprising a first end portion secured to the air bag guide and a second end portion secured to the connector, with the member being movable in response to inflation of the air bag to break the connector to allow the tear seam to move to the opened position.

19 Claims, 3 Drawing Sheets

U.S. PATENT DOCUMENTS

| | | |
|---|---|---|
| 6,588,838 B1 | 7/2003 | Dick, Jr. et al. |
| 7,004,496 B2 * | 2/2006 | Bossecker et al. ....... 280/730.2 |
| 7,134,685 B2 | 11/2006 | Panagos et al. |
| 2004/0195029 A1 * | 10/2004 | Feldman ..................... 180/271 |
| 2006/0113752 A1 | 6/2006 | Tracht |
| 2006/0113761 A1 | 6/2006 | Tracht |

FOREIGN PATENT DOCUMENTS

| | | |
|---|---|---|
| EP | 0 782 944 A1 | 7/1997 |
| FR | 2 806 685 A1 | 9/2001 |
| GB | 2 410 011 A | 7/2005 |
| WO | WO00/06426 A1 | 2/2000 |

* cited by examiner

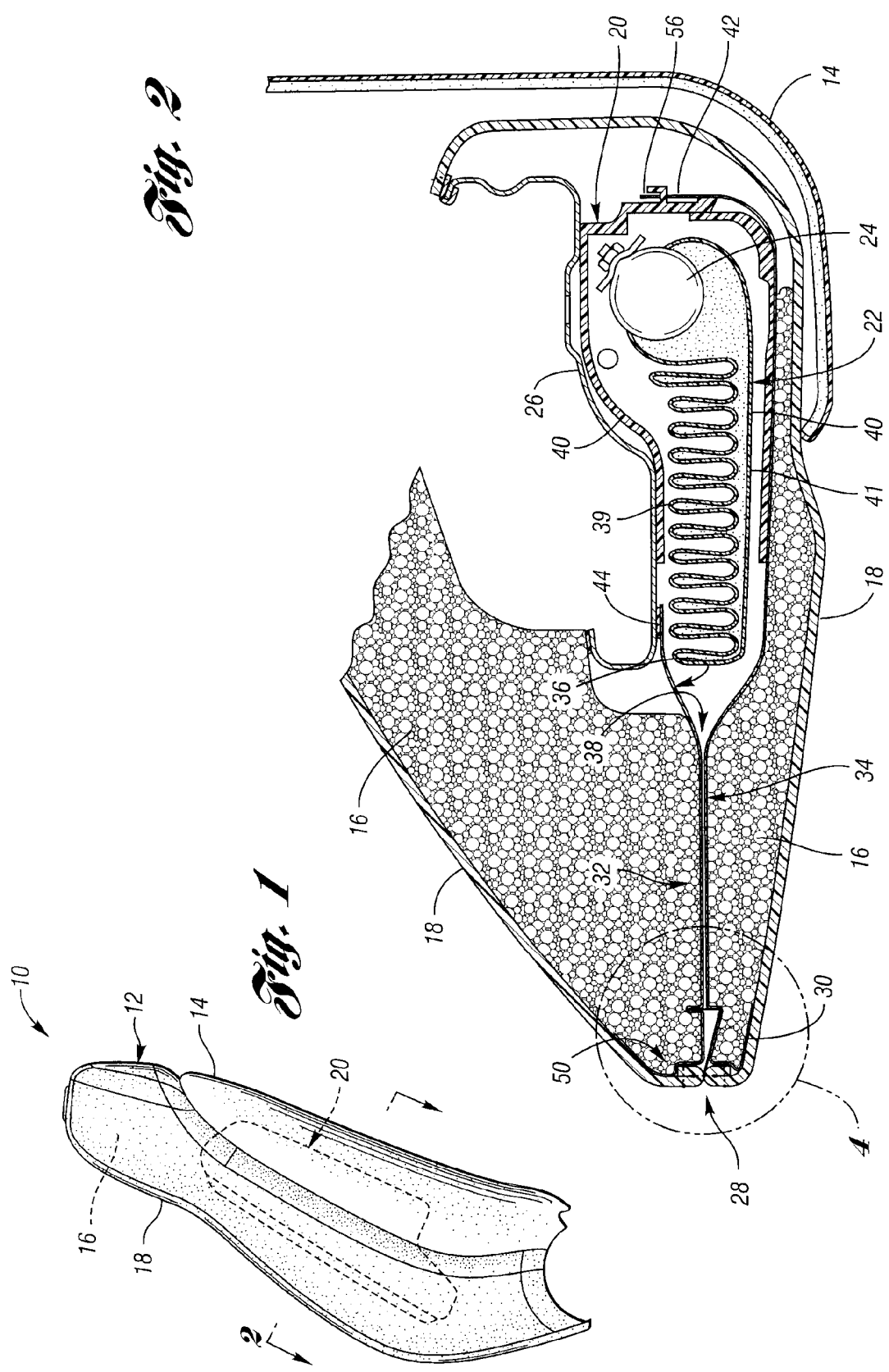

VEHICLE SEAT ASSEMBLY WITH AIR BAG SEAM OPENER

BACKGROUND OF THE INVENTION

1. Field of the Invention

The present invention relates to a vehicle seat assembly, and in particular, a seat assembly including an air bag.

2. Background Art

Vehicles can be equipped with side air bags, which may be in the form of a side air curtain disposed in a headliner of the vehicle, or alternatively, may be an air bag disposed within a vehicle seat assembly. One limitation of air bags that are located within a seat assembly, is that the air bag needs to break through the seating material before it can fully deploy to protect a vehicle occupant. During deployment, such an air bag may encounter foam, or other seat pad materials, and must then break through a seat trim cover in order to escape from the seat assembly. Another limitation is that the air bag should break through the cover material at a predetermined location to optimize effectiveness.

Prior vehicle seat assemblies equipped with side air bags and manufacturing methods are disclosed in U.S. Pat. Nos. 5,816,610, 5,860,673, 5,938,232, 6,045,151, 6,237,934 and 6,588,838, for example.

SUMMARY OF THE INVENTION

Under the invention, a vehicle seat assembly is provided. In at least one embodiment, the vehicle seat assembly comprising a frame, a seat pad adjacent the frame, and a trim cover extending over the seat pad and including a first and a second portion forming a release seam adjacent the seat pad, a connector extending between the first and second portions of the trim cover at the release seam to maintain the release seam in a first, closed position, and an air bag assembly mounted on the frame within the trim cover in a spaced relationship from its air bag release seam. In accordance with this embodiment, the air bag assembly includes an inflator and a folded air bag that is inflated by the inflator to unfold and project outwardly from the seat through the air bag release seam of the trim cover, when the air bag seam is in a second, opened position. Further in accordance with this embodiment, the vehicle seat assembly further includes an air bag guide including an inner panel and an outer panel, with each panel having an outer extremity, with the outer extremity of the inner panel being secured to the first portion of the trim cover and the outer extremity of the outer panel being secured to the second portion of the trim cover, and a member comprising a first end portion secured to the outer panel and a second end portion secured to the connector, with the member being movable in response to inflation of the air bag with sufficient force to break the connector to allow the tear seam to move to the opened position.

In at least one embodiment, the movement of the member is in response to the inner and outer panel members moving away from each other. In yet another embodiment, the second end portion of the member comprises a loop which the connector extends through.

In at least another embodiment, the member includes a body portion extending between the first and second end portions, with at least a portion of the body portion being slidably supported on the inner panel.

In still yet at least another embodiment, the inner panel includes a loop which the body portion of the member extends through to slidably support the body portion.

In still yet at least another embodiment, the flexible member comprises a strap or a string. In still yet a further embodiment, the connector comprises stitching.

In yet at least another embodiment, the vehicle seat assembly comprises a frame, a seat pad adjacent the frame, and a trim cover extending over the seat pad that includes a first portion and a second portion that cooperate to form a release seam adjacent the seat pad, and a connector extending between and connecting the first and second portions of the trim cover at the release seam to maintain the release seam in a first, closed position. In this embodiment, the seat assembly further comprises an air bag assembly within the trim cover including an inflator and an air bag that is inflated by the inflator to unfold and project outwardly from the seat through the air bag release seam of the trim cover when the air bag seam is in a second, opened position. In this embodiment, the seat assembly also further comprises an air bag guide including an inner panel and an outer panel, and a member comprising a first end portion secured to the inner panel and a second end portion secured to the connector, with the member being movable in response to inflation of the air bag to break the connector to allow the tear seam to move towards the opened position.

In still yet at least another embodiment, the vehicle seat assembly comprises a frame, a seat pad adjacent the frame, a trim cover extending over the seat pad and including a first portion and a second portion that cooperate to form a release seam adjacent the seat pad, a stitching extending between and connecting the first and second portions of the trim cover at the release seam to maintain the release seam in a first, closed position, and an air bag assembly mounted on the frame within the trim in a spaced relationship from its air bag release seam, with the air bag assembly including an inflator and a folded air bag that is inflated by the inflator to unfold and project outwardly from the seat through the air bag release seam to the trim cover, when the air bag seam is in a second, opened position. In this embodiment, the seat assembly further comprises an air bag guide including an inner panel and an outer panel, with each panel having an outer extremity, and with the outer extremity of the inner panel being secured to the first portion of the trim cover and the outer extremity of the outer panel being secured to the second portion of the trim cover, and a member comprising a first end portion secured to the outer panel, a second end portion comprising a loop secured to the stitching, and a body portion extending between the first and second end portions and being slidably supported on the inner panel, the member being movable in response to inflation of the air bag with sufficient force to break the stitching to allow the tear seam to move the opened position, wherein the movement of the member is in response to the inner and outer panel members moving away from each other.

While exemplary embodiments in accordance with the invention are illustrated and disclosed, such disclosure should not be construed to limit the claims. It is anticipated that various modifications and alternative designs may be made without departing from the scope of the invention.

BRIEF DESCRIPTION OF THE DRAWINGS

FIG. 1 is a fragmentary side view of a portion of a seat assembly in accordance with the present invention;

FIG. 2 is a fragmentary sectional view of the seat assembly shown in FIG. 1, taken through line 2-2;

DETAILED DESCRIPTION OF THE PREFERRED EMBODIMENT(S)

Figure 3:
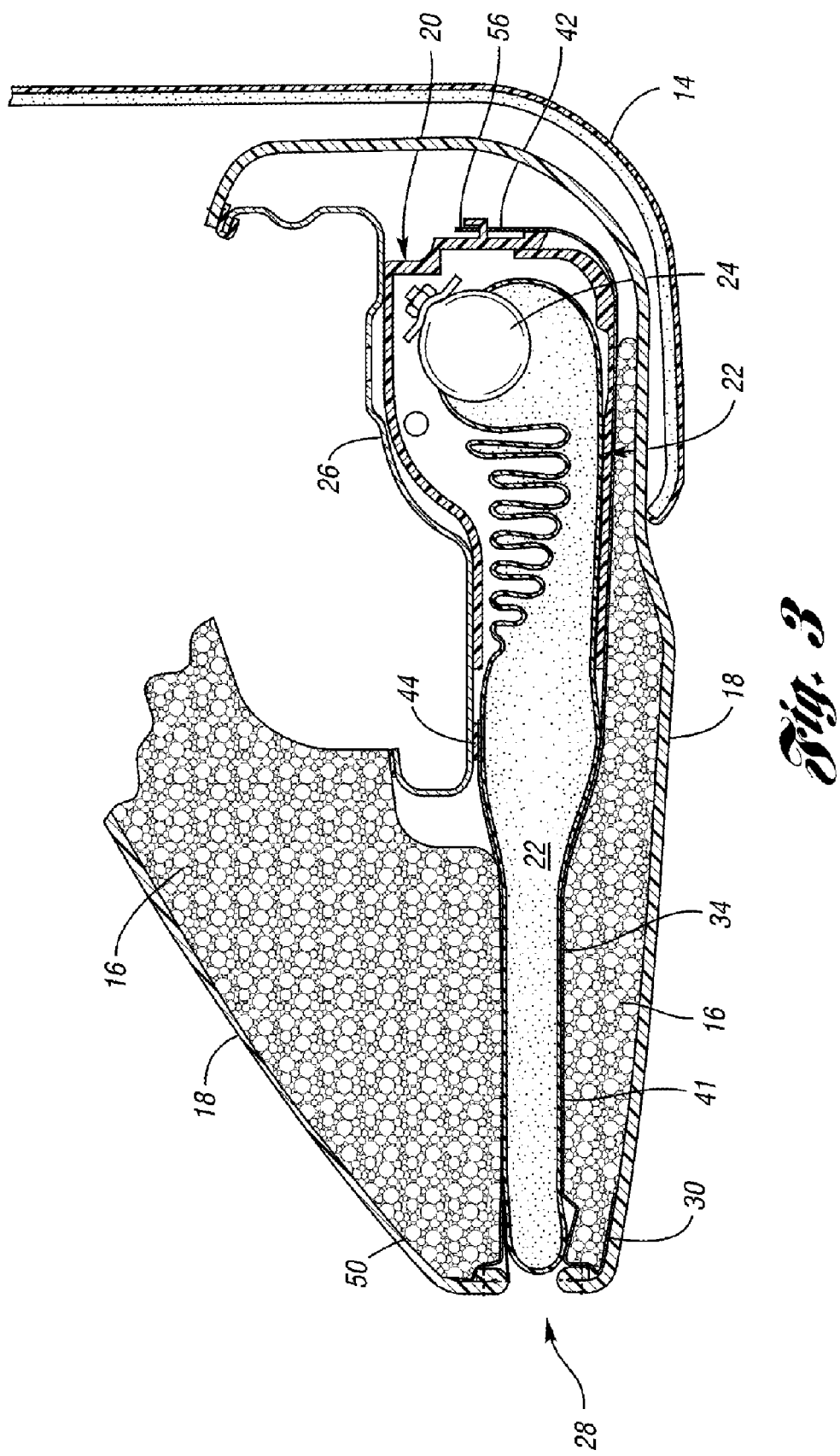
FIG. 3 is a view similar to FIG. 2 showing the parts in a different position.

As required, detailed embodiments of the present invention are disclosed herein. However, it is to be understood that the disclosed embodiments are merely exemplary of the invention that may be embodied in various alternative forms. The figures are not necessarily of scale, some features may be exaggerated or minimized to show details of particular components. Therefore specific structural and functional details disclosed herein are not to be interpreted as limiting, but merely as a representative basis for the claims and/or a representative basis for teaching one skilled in the art to variously employ the present invention.

Moreover, except where otherwise expressly indicated, all numerical quantities in this description and in the claims indicating amounts of materials or conditions of reactions and/or use are to be understood as modified by the word "about" in describing the broader scope of this invention. Practice within the numerical limits stated is generally preferred. Also, unless expressly stated to the contrary, the description of a group or class of materials as suitable preferred for a given purpose in connection with the invention implies that mixtures of any two or more members of the group or class may be equally suitable or preferred.

FIG. 1 shows a portion of a seat assembly 10 in accordance with the present invention. The seat assembly 10 includes a seat back 12, and seat pad 16 covered by a trim cover 18. As is well known, the seat assembly 16 includes a seat bottom (not shown). The trim cover 18 may be made of any suitable material such as cloth, vinyl or leather, etc. As is shown in FIG. 1, in at least some embodiments, a relatively rigid plastic molding 14 can be provided in the rear area of the seat assembly 10 to provide support and/or for aesthetics.

In at least one embodiment, the seat pad 16 is made from a molded polymeric material, such as a polyurethane foam. The use of a polymeric foam material to construct the seat pad 16 can be cost effective and can provide the flexibility needed to easily change the shape of the seat pad for different types of seat assemblies. Of course, other types of polymeric materials may be molded to form the seat pad 16.

Disposed within the seat back 12 is an air bag assembly, such as a side air bag assembly 20. While the side air bag assembly 20 is shown on the seat back 12, which is a usage for which it has particular utility, it is also possible for the side air bag assembly to be utilized with a seat bottom even though the seat back usage is specifically disclosed. Also, as illustrated, the air bag assembly 20 is located at an outboard lateral side or extremity of the seat to provide protection against adjacent vehicle structure, but it is also possible to have the side air bag assembly located at the inboard lateral side to provide protection against an adjacent vehicle occupant and to also have side air bag assemblies at both outboard and inboard locations for protection in both lateral directions.

As shown in FIG. 2, the air bag assembly 20 includes an air bag 22 and an inflator 24, which is configured to supply inflation fluid such as gas to the air bag 22, thereby facilitating deployment of the air bag 22. In at least one embodiment, the air bag assembly 20 also includes a housing 40 which at least partially surrounds the air bag 22 and the inflator 24.

Also shown in FIG. 2 is a portion of a seat frame 26 which can be used for mounting the seat assembly 10 to a vehicle. The seat pad 16 is disposed proximate the frame 26 and air bag assembly 20 and may be directly attached to the frame 26 at various points. The trim cover 18 includes an air bag release seam 28 which in at least one embodiment is adjacent to a side 30 of the seat pad 16.

Figure 4:
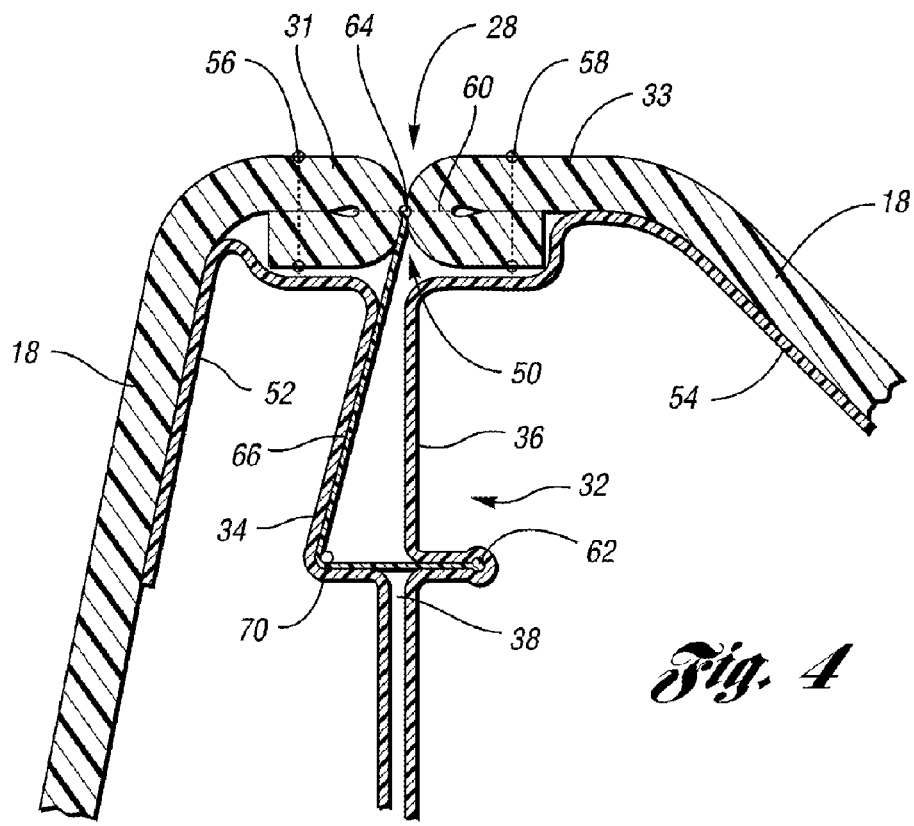
FIG. 4 is a fragmentary sectional view of a detail of the seat assembly shown in FIG. 2.

In the embodiment shown in FIG. 4, the trim cover 18 includes end portions 31, 33 that cooperate to form seam 28. As shown in the embodiment illustrated in FIG. 4, the end portions 31, 33 have suitable connections, shown schematically as stitching 56 and 58, that help to form edges that form seam 28. As also shown in the embodiment illustrated in FIG. 4, the ends 31 and 33 of cover 18 are connected to each other at seam 18 via any suitable connection member, such as stitching 60 that is shown schematically to help maintain seam 28 in a closed position. While stitching 60 is shown schematically in FIG. 4, it should be understood that other connection members such as a breakable plastic member could be used.

The air bag assembly 20 is located within the trim cover 18 and may be conventionally mounted, such as on the frame 26, adjacent the air bag release seam 28 but in a spaced relationship from the release seam. The schematically illustrated folded air bag 22, upon deployment, is inflated by inflation fluid from the inflator 24 to unfold and project outwardly from the seat 10 through the air bag release seam 28 of the trim cover 18 (FIG. 3).

With continuing reference to FIG. 2, an air bag guide of the seat back component is generally indicated by 32 and includes an inner panel 34 and an outer panel 36 that are each made of any suitable material effective to protect the seat pad 16 during deployment of the air bag 22. For example, a woven or non-woven cloth material, which may include natural or synthetic materials such as nylon. One material that is found to be effective is a polyester material, of the type from which the air bag 22 may be manufactured. Regardless of the type of material used to make the air bag guide 32, the use of the air bag guide 32 can be helpful in reducing friction on the air bag 22 as it deploys. Although a polymer such as nylon may be particularly beneficial, even a fleece material will help reduce the friction on the air bag 22. This is because the air bag guide 32 inhibits contact between the deploying air bag 22 and the seat pad 16 and helps to prevent small particles from separating from the seat pad and being introduced into the vehicle compartment.

The inner and outer panels 34, 36 of the air bag guide 32 respectively include inner extremities 42, 44 that can be attached suitably to the housing 40 and/or frame 26 to effectively associate the air bag guide 32 with the housing 40 of the air bag assembly 20. As shown in the embodiment illustrated in FIG. 2, the inner extremity 44 of the outer panel 36 is connected with the frame 26 and the inner extremity 42 of the inner panel 34 is connected with the housing 40 at 56.

As shown in FIG. 4, the inner and outer panels 34, 36 of the air bag guide 32 respectively include outer extremities 52, 54 attached to opposed ends 31 and 33 of the trim cover 18 adjacent the seam 28. The outer extremities 52, 54 of inner and outer panels 34, 36 can be attached to the trim cover 18 in any suitable manner. For instance, the outer extremities 52, 54 can be attached to the trim cover 18 via stitching, ultrasonic welding, adhesive, etc., among other suitable manners. Also, in one embodiment, the outer extremities 52, 54 of the air bag guide 32 could be secured to the trim cover 18 via in situ molding of a polymeric seat pad 16. In this embodiment, the trim cover 18 and the guide 32 would both be suitably placed in the polymeric, such as polyurethane, mold so that the polymeric material used to form pad 16 could form around and secure the guide 32 to the trim cover 18. In at least this embodiment, the inner and outer panels 34 and 36 could have small openings, such as holes, that can allow relatively small amounts of polymeric material to extend between the panels. These relatively small amounts would not hinder deployment of the air bag 22.

A release member 50 extends between connector 60 and the air bag guide 32. In at least one embodiment, the release member 50 is movable in response to inflation of the air bag 22 with a sufficient force to break the connector 60 to allow the tear seam 28 to move to an opened position to enable the air bag 22 to extend through the release seam 28 and outside the seat assembly 10 into an occupant protection position. In the embodiment illustrated in FIG. 4, the release member 50 includes a first end 62 connected with the air bag guide 32, a second end 64 connected with the connector 60, and a body portion 66 extending between the first end 62 and the second end 64.

The first end 62 of the release member 50 is shown in the embodiment illustrated in FIG. 4 to be connected to the outer panel 36. In certain embodiments, the first end 62 could be connected to the outer panel 36 by crimping the outer panel 36 around the second end 64 of the release member 50, as shown in FIG. 4, or by other suitable means such as adhesive, ultrasonic welding, and molding in place.

As shown in the embodiment illustrated in FIG. 4, the second end 64 of the release member 50 includes an opening, such as a loop, which at least a portion of the connector 60 extends through. In other embodiments, the second end 64 could also include a tab portion sewn or otherwise connected with the connector 60. In this embodiment, at least a portion of the connector 60, such as one or more thread loops, would be secured to the tab portion.

It should be understood that the connection between the first end 62 of the release member 50 and the outer panel 36 should be greater, i.e., stronger, than the connection between the second end 64 and the connector 60. This is because the relative movement of the panels 34 and 36 away from each other, and/or the force of the deploying air bag 22 on the release member 50, causes sufficient tension on the release member 50 to cause the connection 60 to rupture. If the connector 60 is continuous stitching that extends the length of the tear seam, as is shown in the embodiment illustrated in FIG. 4, the release member 50 need only be connected to one thread, or loop, of the stitching since breaking one thread/loop in a continuous stitching will allow the continuous stitching to unravel, thereby allowing seam 28 to open.

In the embodiment shown in FIG. 4, the body portion 66 of the release member 50 is slidably supported on the inner panel 34. In this embodiment, the inner panel member 34 has a guiding mechanism formed therein or attached thereto to slidably support the body portion 66 of the release member 50 thereon. In the embodiment shown in FIG. 4, the inner panel 34 includes a loop 70 through which the body portion 66 of the release member is slidable. It should be understood that other mechanisms than the loop 70 such as a molded in wire or plastic loop could be used to slidably support the body portion 66 of the release member 50 on the inner panel 34.

The release member 50 can be made by any suitable process and of any suitable material such as nylon, PP, and PE and in at least one embodiment is made of a somewhat flexible material such as a wire or band. In at least one embodiment the body portion 66 of the release member 50 comprises a string, band, wire, textile, mesh, tab, or a strap.

In at least one embodiment, the release member 50 has a length, i.e., distance between first end 62 and second end 64, of 1 to 100 cm (centimeters), in other embodiments of 5 to 100 cm, and in yet other embodiments of 15 to 50 cm. In at least one embodiment, the release member 50 has a general thickness of 0.01 to 5 mm (millimeters), in other embodiments of 0.05 to 4 mm, and in yet other embodiments of 0.2 to 2.0 mm.

In at least one embodiment, the air bag guide 32 is effective to prohibit all contact between the deploying air bag 22 and the seat pad 16. This can help to prevent energy loss from the air bag 22 by decreasing friction and protecting the seat pad 16 from damage. This, in turn, can also help to reduce the deployment time for the air bag 22 and/or the amount of inflation fluid required to deploy the air bag.

In at least one embodiment, the inner and outer panels 34 and 36 of the air bag guide 32 form a deployment channel 38 for the air bag 22. As shown in FIGS. 2-4, the deployment channel 38 is oriented to facilitate deployment of the air bag 22 through the seam 28 in the trim cover 18.

Upon deployment of the air bag assembly 20, as shown schematically in FIG. 3, the deploying air bag 22 causes relative movement of the flexible inner and outer panels 34 and 36 away from each other which then provide a guiding function of the unfolding air bag 22 as it moves between the panels toward the air bag release seam 28. The separation of the panels 34 and 36 also causes tension on the release member 50 that causes connection 60 to rupture to allow seam 28 to more readily move to its opened position (FIG. 3), allowing the air bag 32 to eventually tear open the release seam for outward projection of the air bag to provide the occupant protection. Furthermore, as the air bag 22 deploys through the deployment channel 38, the air bag guide 32 acts as a blocking member that forms a barrier on two sides 39, 41 of the air bag 22, thereby inhibiting contact between the air bag 22 and the seat pad 16. Thus, the seat pad 16 is moved away from the air bag 22 as it deploys through the deployment channel 38.

In at least one embodiment, the release member 50 can be positioned relative to the folded air bag 22 such that deployment of the air bag causes impact of the air bag on the release member 50 causing the required tension to rupture connection 60.

As shown in FIGS. 3-4, the attachment of the outer extremities 52, 54 to opposed ends 31, 33 of the cover 18 adjacent the seam 28 further helps to facilitate deployment of the air bag 22 through the seam 28. This is because the deployment channel 38 opens as the air bag 22 is deployed, and this causes the deploying air bag 22 to exert an outward force on the trim cover 18 at the seam 28; this helps to open the seam 28 to provide an easy exit for the air bag 22. Also, release member 50 helps to ensure that the air bag 22 will deploy in the predetermined desired manner through the seam 28. Because of release members 50 relatively consistent manufacturing process, use of release member 50 can help ensure relatively consistent deployment of air bag in seat assemblies 10 employing the use of release member 50.

Figure 5:
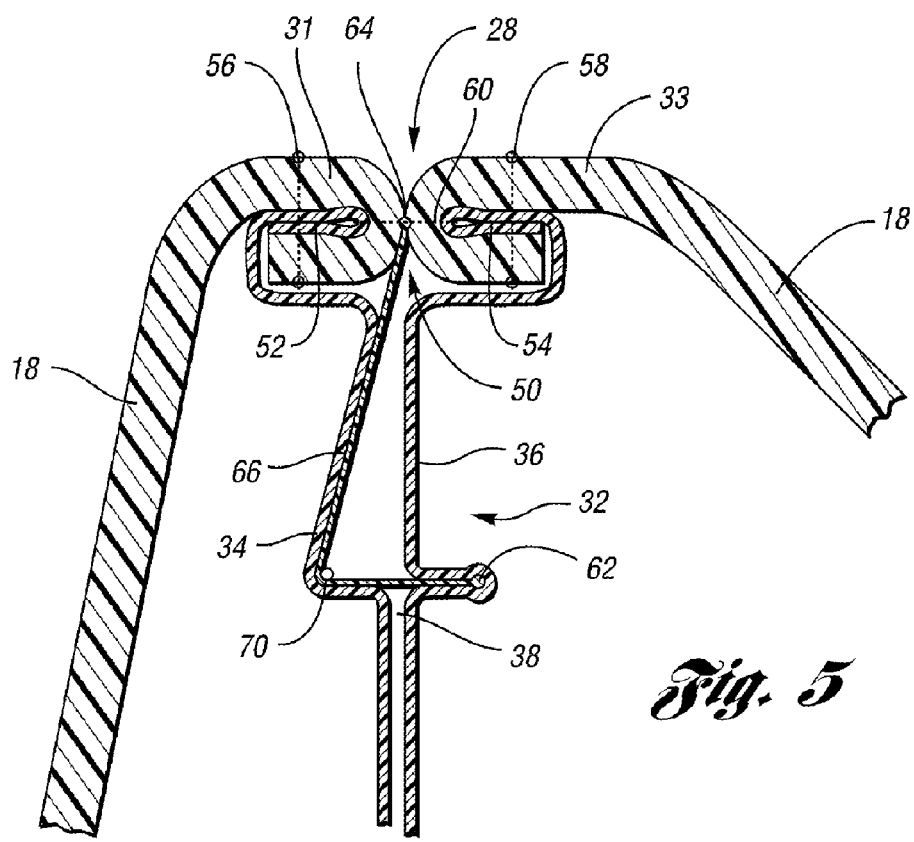
FIG. 5 is a view similar to FIG. 4 showing another embodiment.

As shown in FIG. 4, the ends 31 and 33 of cover 18 are connected with the inner and outer panels 34 and 36, respectively. This helps to transfer the force from the air bag guide 32, and facilitates separation of the seam 28. In another embodiment, shown in FIG. 5, outer extremities 52 and 54 of panels 34 and 36, respectively, could be looped inside ends 31 and 33, respectively, to further facilitate separation of seam 28.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle seat assembly, comprising:
   a frame;
   a seat pad adjacent the frame;
   a trim cover extending over the seat pad and including a first and a second portion forming a release seam adjacent the seat pad;
   a connector extending between the first and second portions of the trim cover at the release seam to maintain the release seam in a first, closed position;

an air bag assembly mounted on the frame within the trim cover in a spaced relationship from the release seam, the air bag assembly including an inflator and a folded air bag that is inflated by the inflator to unfold and project outwardly from the seat through the release seam of the trim cover, when the air bag seam is in a second, opened position;

an air bag guide including an inner panel and an outer panel, each panel having an outer extremity, the outer extremity of the inner panel being secured to the first portion of the trim cover and the outer extremity of the outer panel being secured to the second portion of the trim cover; and a member comprising a first end portion secured to the outer panel and a second end portion secured to the connector, with the member being movable in response to inflation of the air bag with sufficient force to break the connector to allow the tear seam to move to the opened position.

2. The vehicle seat assembly of claim 1, wherein the movement of the member is in response to the inner and outer panels moving away from each other.

3. The vehicle seat assembly of claim 1, wherein the second end portion of the member comprises a ioop which the connector extends through.

4. The vehicle seat assembly of claim 3, wherein the member includes a body portion extending between the first and second end portions.

5. The vehicle seat assembly of claim 4, wherein at least a portion of the body portion is slidably supported on the inner panel.

6. The vehicle seat assembly of claim 5, wherein the inner panel includes a loop which the body portion of the member extends through to slidably support the body portion.

7. The vehicle seat assembly of claim 4, wherein the member comprises a flexible member.

8. The vehicle seat assembly of claim 7, wherein the flexible member comprises a strap or a string.

9. The vehicle seat assembly of claim 1, wherein the connector comprises stitching.

10. A vehicle seat assembly, comprising:
a frame;
a seat pad adjacent the frame;
a trim cover extending over the seat pad, the trim cover including a first portion and a second portion that cooperate to form a release seam adjacent the seat pad;
a connector extending between and connecting the first and second portions of the trim cover at the release seam to maintain the release seam in a first, closed position;
an air bag assembly within the trim cover, the air bag assembly including an inflator and an air bag that is inflated by the inflator to project outwardly from the seat through the release seam of the trim cover, when the air bag seam is in a second, opened position;
an air bag guide including an inner panel and an outer panel; and
a member comprising a first end portion secured to the outer panel and a second end portion secured to the connector, the second end portion of the member comprising an opening which the connector extends through, the member being movable in response to inflation of the air bag to break the connector to allow the tear seam to move towards the opened position.

11. The vehicle seat assembly of claim 10, wherein the movement of the member is in response to the inner and outer panels moving away from each other.

12. The vehicle seat assembly of claim 10, wherein the member includes a body portion extending between the first and second end portions, the body portion being slidably supported on the inner panel.

13. The vehicle seat assembly of claim 12, wherein the inner panel includes an opening which the body portion of the member extends through to slidably support the body portion.

14. The vehicle seat assembly of claim 10, wherein the member comprises a flexible member.

15. The vehicle seat assembly of claim 10, wherein the flexible member comprises a strap or a string.

16. The vehicle seat assembly of claim 15, wherein the connector comprises stitching.

17. A vehicle seat assembly, comprising:
a frame;
a seat pad adjacent the frame;
a trim cover extending over the seat pad, the trim cover including a first portion and a second portion that cooperate to form a release seam adjacent the seat pad;
a stitching extending between and connecting the first and second portions of the trim cover at the release seam to maintain the release seam in a first, closed position;
an air bag assembly mounted on the frame within the trim cover in a spaced relationship from the release seam, the air bag assembly including an inflator and a folded air bag that is inflated by the inflator to unfold and project outwardly from the seat through the release seam of the trim cover, when the air bag seam is in a second, opened position;
an air bag guide including an inner panel and an outer panel, each panel having an outer extremity, the outer extremity of the inner panel being secured to the first portion of the trim cover and the outer extremity of the outer panel being secured to the second portion of the trim cover; and
a member comprising a first end portion secured to the outer panel, a second end portion comprising a loop secured to the stitching, and a body portion extending between the first and second end portions and being slidably supported on the inner panel, the member being movable in response to inflation of the air bag with sufficient force to break the stitching to allow the tear seam to move to the opened position, wherein the movement of the member is in response to the inner and outer panels moving away from each other.

18. The vehicle seat assembly of claim 17, wherein the inner panel includes a loop which the body portion of the member extends through to slidably support the body portion.

19. The vehicle seat assembly of claim 18, wherein the member comprises a strap or a string.

* * * * *